United States Patent [19]

Kishida et al.

[11] Patent Number: 5,055,529

[45] Date of Patent: Oct. 8, 1991

[54] PROCESSING AID FOR THERMOPLASTIC RESIN, AND THERMOPLASTIC RESIN COMPOSITION COMPRISING SAME

[75] Inventors: Kazuo Kishida, Hiroshima; Kiyokazu Kitai, Tokyo; Masahiro Kaneda, Ohtake; Kenji Okano, Yokohama, all of Japan

[73] Assignee: Mitsubishi Rayon Company, Ltd., Tokyo, Japan

[21] Appl. No.: 329,872

[22] Filed: Mar. 28, 1989

[30] Foreign Application Priority Data

Mar. 29, 1988 [JP] Japan .................. 63-75554

[51] Int. Cl.$^5$ ............... C08F 265/06; C08L 25/04; C08L 27/06; C08L 55/02
[52] U.S. Cl. .................. 525/309; 525/165; 525/199; 525/227; 525/237; 525/238; 525/239; 525/241
[58] Field of Search ............... 525/309, 165, 199, 227, 525/237, 238, 239, 241

[56] References Cited

U.S. PATENT DOCUMENTS 3,251,904  5/1966  Souder et al. .................. 525/309
3,925,510 12/1975  Ide et al. ........................ 525/309

FOREIGN PATENT DOCUMENTS 0040543 11/1981 European Pat. Off. .
0154189  9/1985 European Pat. Off. .

OTHER PUBLICATIONS

WPIL, File Supplier, Accession No. 88-158470, Derwent Publications Ltd., London, GB; & JP-A-63 099 263 (Mitsubishi Rayon) 30-04-1988, Whole Abstract.

*Primary Examiner*—John C. Bleutge
*Assistant Examiner*—Vasu S. Jagannathan
*Attorney, Agent, or Firm*—Oblon, Spivak, McClelland, Maier & Neustadt

[57] ABSTRACT

A processing aid for a thermoplastic resin is disclosed, which is a two-stage polymer obtained by polymerizing (B) 5 to 50 parts by weight of a monomer or monomer mixture composed mainly of methyl methacrylate in the presence of (A) 50 to 95 parts by weight of a polymer comprising 100 to 50% by weight of units of a methacrylic acid ester other than methyl methacrylate and 0 to 50% by weight of units of other monomer copolymerizable with the methacrylic acid ester and having a reduced viscosity $\eta sp/C$ not larger than 2.0 dl/g, so that the total amount of the components (A) and (B) is 100 parts by weight and the reduced viscosity $\eta sp$ of the final polymer is not larger than 2.0 dl/g. A thermoplastic resin having the processing aid incorporated therein has an improved shaping processability, and a shaped article mode therefrom has good surface characteristics.

9 Claims, No Drawings

PROCESSING AID FOR THERMOPLASTIC RESIN, AND THERMOPLASTIC RESIN COMPOSITION COMPRISING SAME

BACKGROUND OF THE INVENTION

(1) Field of the Invention

The present invention relates to a processing aid for a thermoplastic resin, which is obtained by polymerizing a monomer or monomer mixture composed mainly of methyl methacrylate in the presence of a polymer composed mainly of a methacrylic acid ester other than methyl methacrylate. More particularly, the present invention relates to a processing aid having properties such that, when this processing aid is incorporated into a thermoplastic resin such as a vinyl chloride resin, a polycarbonate resin, a polyester resin, an ABS resin, a styrene resin, a methacrylic resin or a polyethylene resin, an excellent gelation-promoting effect is obtained without degradation of the inherent characteristics of the thermoplastic resin, and since the viscosity in the molten state is not increased, the formation of air marks or flow marks is controlled, and to a thermoplastic resin composition comprising this processing aid.

(2) Description of the Related Art

Since thermoplastic resins, especially vinyl chloride resins, have excellent physical and chemical properties, they are widely used in various fields, but since the processing-possible temperature is close to the heat decomposition temperature in vinyl chloride resins, they have problems in that the processing-possible temperature range is extremely narrow and the processability is poor.

To solve this problem, a process has been adopted in which a plasticizer is incorporated in a vinyl chloride resin. According to this process, the above-mentioned problem is solved to a certain extent, but since the incorporated plasticizer is volatilized at the heat shaping step, the intended object cannot be attained, and the mechanical properties of the obtained shaped article are degraded.

To improve the processability, that is to increase the gelation speed at the step of processing and shaping a vinyl chloride resin, render deep-draw-forming possible, maintain an unchanged gloss on the surface of a shaped article even if processing and shaping are carried out for a long time, or smooth the surface of the obtained shaped article, a process has been proposed in which a copolymer composed mainly of methyl methacrylate is incorporated as a processing aid (see, for example, Japanese Examined Patent Publication No. 49-19095, Japanese Examined Patent Publication No. 52-1746 and Japanese Examined Patent Publication No. 53-2898).

In a vinyl chloride resin composition comprising a processing aid composed mainly of the above-mentioned specific copolymer, the gelation speed is high at the processing step and the tensile elongation at a high temperature is increased, and therefore, deep-draw-forming becomes possible and an application of vacuum forming or contour extrusion also is possible. The vinyl chloride resin composition disclosed in the above-mentioned Japanese Examined Patent Publication No. 52-1746 can be used in not only the rigid resin field but also the soft resin field, because the formation of fish eyes is controlled.

Nevertheless, a resin composition formed by incorporating a processing aid as mentioned above inherently has a high stickiness to a metal surface and has a high melt viscosity, and therefore, the torque (resistance to kneading) is greatly increased at the mold-processing step and the generation of heat is extreme. Namely, the resin composition is defective from the productivity viewpoint. Moreover, when the resin composition is shaped into a sheet or film, flow marks and air marks are formed, and the commercial value of the shaped article is degraded. The use of various lubricants in combination with this processing aid has been attempted as means for overcoming these defects, but to retain the physical properties of the vinyl chloride resin, the amount of the lubricant used is limited, and this method is not a general solution. Although the torque at the kneading step can be reduced by an addition of a plasticizer or the like, the inherent mechanical properties of the thermoplastic resin are degraded and a new problem, for example, a formation of unmolten parts (fish eyes), arises, and satisfactory solution cannot be obtained.

SUMMARY OF THE INVENTION

Under the above-mentioned backgrounds, the primary object of the present invention is to provide a processing aid which does not have the defects mentioned above, and when a specific amount of this processing aid is incorporated into a thermoplastic resin, especially a vinyl chloride resin, the stickiness of the resulting resin composition to the metal surface at the processing step is reduced, the increase of the melt viscosity and torque is controlled, an excellent gloss can be imparted to the obtained shaped article, the formation of flow marks or air marks is controlled when the resin composition is shaped into a sheet or film, and a good dispersibility is obtained when the processing aid is incorporated into a plasticized vinyl chloride resin or other various thermoplastic resins.

More specifically, in accordance with the present invention, there is provided a processing aid for a thermoplastic resin, which comprises a two-stage polymer obtained by polymerizing (B) 5 to 50 parts by weight of a monomer or monomer mixture composed mainly of methyl methacrylate in the presence of (A) 50 to 95 parts by weight of a polymer comprising 100 to 50% by weight of units of a methacrylic acid ester other than methyl methacrylate and 0 to 50% by weight of units of other monomer copolymerizable with the methacrylic acid ester and having a reduced viscosity $\eta sp/C$ not larger than 2.0 (as measured at 25° C. with respect to a solution of 0.1 g of the polymer in 100 ml of chloroform; the unit being dl/g; the same will apply hereinafter), so that the total amount of the components (A) and (B) is 100 parts by weight and the reduced viscosity $\eta sp$ of the final polymer is not larger than 2.0.

Furthermore, in accordance with the present invention, there is provided a thermoplastic resin composition comprising 100 parts by weight of a thermoplastic resin and 0.05 to 40 parts by weight of the above-mentioned processing aid.

DESCRIPTION OF THE PREFERRED EMBODIMENTS

The processing aid for a thermoplastic resin according to the present invention can be obtained by a two-stage emulsion polymerization procedure, namely, by emulsion-polymerizing a predetermined amount of a monomer or monomer mixture composed mainly of methyl methacrylate by using a chain transfer agent, an emulsifier and a polymerization initiator in the presence of a first-stage polymer having a reduced viscosity $\eta sp/C$ not larger than 2.0, which is obtained by emulsion-polymerizing a monomer composed mainly of a methacrylic acid ester other than methyl methacrylate, if necessary together with another monomer copolymerizable therewith, in the presence of an emulsifier, a chain transfer agent and a polymerization initiator. When carrying out the present invention, preferably the first-stage polymer is obtained by using butyl methacrylate (major component) as the methacrylic acid ester other than methyl methacrylate and methyl methacrylate (minor component) as the monomer copolymerizable therewith, and the processing aid is obtained by emulsion-polymerizing methyl methacrylate in the presence of this first-stage polymer.

As the methacrylic acid ester other than methyl methacrylate, which is used in the present invention, there can be mentioned ethyl methacrylate, n-butyl methacrylate, isobutyl methacrylate, 2-ethylhexyl methacrylate, benzyl methacrylate, cyclohexyl methacrylate and lauryl methacrylate. Of these, n-butyl methacrylate is especially preferred. An appropriate monomer is selected and used according to the intended use of the processing aid.

At least one member selected from the group consisting of acrylic acid esters, methyl methacrylate, aromatic vinyl compounds and vinyl cyanide compounds can be used as the other monomer copolymerizable with the methacrylic acid ester in the present invention. Of these, methyl methacrylate is especially preferred.

Acrylic acid esters having 2 to 10 carbon atoms in the alkyl group are preferably used as the acrylic acid ester as the other copolymerizable monomer. For example, there can be mentioned methyl acrylate, ethyl acrylate, propyl acrylate, n-butyl acrylate, isobutyl acrylate, hexyl acrylate, octyl acrylate and 2-ethylhexyl acrylate.

As the aromatic vinyl compound, there can be mentioned styrene, α-substituted styrene, nucleus-substituted styrenes and derivatives thereof, such as α-methylstyrene, chlorostyrene and vinyltoluene.

As the vinyl cyanide compound, there can be mentioned, for example, acrylonitrile and methacrylonitrile.

The first-stage polymer as the component (A) comprises 100 to 50% by weight, preferably 55 to 95% by weight, of units derived from the methacrylic acid ester other than methyl methacrylate and 0 and to 50% by weight, preferably 5 to 45% by weight, of units derived from other monomer copolymerizable therewith. If the content of units of the methacrylic acid ester other than methyl methacrylate is lower than 50% by weight, the formation of air marks, flow marks and fish eyes is conspicuous at the processing step, the surface of the obtained shaped article is not smooth, and the physical properties thereof are degraded.

The reduced viscosity $\eta sp/C$ of the first-stage polymer obtained by polymerizing the component (A) alone is not larger than 2.0. If this reduced viscosity is larger than 2.0, it becomes difficult to control the formation of air marks or flow marks or to obtain a shaped article having an excellent surface smoothness. Control of the reduced viscosity to a level not larger than 2.0 is accomplished by carrying out the polymerization while adjusting the amount of the chain transfer agent or polymerization initiator used and the polymerization temperature or other conditions.

The amount of the component (A) in 100 parts by weight of the Two-stage polymer of the present invention is 50 to 95 parts by weight, preferably 75 to 90 parts by weight. If the amount of the component (A) is smaller than 50 parts by weight, the inherent effects of the component (A) on the processing characteristics are not easily obtained, and it becomes difficult to obtain a shaped article having an excellent surface gloss.

The component (B) used in the second stage for obtaining the two-stage polymer of the present invention is a monomer or monomer mixture composed mainly of methyl methacrylate, and one of the characteristic features of the component (B) is that methyl methacrylate is an indispensable component. Usually, the monomer mixture is composed of more than 50% by weight of methyl methacrylate and less than 50% by weight of a copolymerizable monomer. As the copolymerizable monomer, there can be mentioned methacrylic acid esters other than methyl methacrylate, and other copolymerizable monomers which are listed with regard to the copolymerization for the preparation of the component (A). The amount of the component (B) in 100 parts of the two-stage polymer is 5 to 50 parts by weight, preferably 10 to 30 parts by weight. Where the amount of the component (B) is smaller than 5 parts by weight, when the obtained two-stage polymer is incorporated into a thermoplastic resin, especially a vinyl chloride resin, the gelation-promoting effect of the vinyl chloride resin is low and a sufficient shaping processability is not obtained, and a problem arises with respect to the productivity. If the amount of the component (B) exceeds 50 parts by weight, when a resin composition formed by incorporating the obtained two-stage polymer into a thermoplastic resin is shaped into a film or the like, fish eyes are formed on the surface of the film or the like, and the quality is reduced.

The two-stage polymer of the present invention has a reduced viscosity not larger than 2.0 as measured at 25° C. with respect to a solution of 0.1 g of the polymer is 100 ml of chloroform. If the reduced viscosity of the two-stage polymer exceeds 2.0, when a thermoplastic resin composition having the two-stage polymer incorporated therein is shaped, the thermoplastic resin composition exhibits an enhanced rate of melting (i.e., an enhanced gelation speed), but exhibits an undesirably high viscosity and it becomes difficult to control the thermal degradation thereof. Thus, it is impossible to subject the resin composition to shaping over a long period of time and also to enhance the number of screw revolution, and the shaping processabity is reduced. Furthermore, flow marks and air marks are formed.

When forming a two-stage polymer by the emulsion polymerization in the production of the two-stage polymer of the present invention, preferably the polymerization of the component (B) in the presence of the component (A) is advanced without adding a fresh emulsifier, whereby formation of a homopolymer of the component (B) is substantially controlled. Control of the reduced viscosity of the two-stage to a level lower than 2.0 is accomplished by carrying out the polymerization while adjusting the amount of the chain transfer agent or the polymerization initiator used and the polymerization temperature or other conditions.

Known emulsifiers can be used in carrying out the present invention. For example, there can be mentioned anionic surface active agents such as fatty acid salts, alkyl sulfate, alkylbenzenesulfonate, alkyl phosphate and dialkyl sulfo-succinate, nonionic surface active agents such as polyoxyethylene alkyl ethers, polyoxyethylene fatty acid esters, sorbitan fatty acid esters and glycerol fatty acid esters, and cationic surface active agents such as alkylamine salts. These surface active agents can be used singly or as a mixture of two or more thereof.

As the polymerization initiators, water-soluble or oil-soluble single systems or redoxy systems can be used in the present invention. For example, inorganic initiators such as ordinary persulfates, or organic peroxides or azo compounds are singly used, or combinations of the foregoing compounds with a sulfite, a hydrogensulfite, a thio sulfate, a primary metal salt or sodium formaldehyde sulfoxylate can be used as the redox type initiator. As preferred examples of the persulfate, there can be mentioned sodium persulfate, potassium persulfate and ammonium persulfate. As preferred examples of the organic peroxide, there can be mentioned t-butyl hydroperoxide, cumene hydroperoxide benzoyl peroxide and lauroyl peroxide.

Known chain transfer agents can be used. For example, there can be used alkyl mercaptans having 4 to 12 carbon atoms in the alkyl group, such as n-octylmercaptan, tertiary-octylmercaptan and tertiary-dodecyl-mercaptan.

After completion of the polymerization reaction, the two-stage polymer is recovered in the form of a powder by coagulating and precipitating the two-stage polymer by salting-out or acid precipitation, and separating and washing the two-stage polymer, or by spray-drying or freeze-drying.

The obtained processing aid can be applied to a thermoplastic resin. As the thermoplastic resin, there can be mentioned, for example, vinyl chloride resins (inclusive of chlorinated vinyl chloride resins and vinylidene chloride resins), polycarbonate resins, polyethylene resins, vinyl fluoride resins, polyester resins, styrene resins, acrylonitrile styrene copolymer resins, methacrylic resins and ABS resins. As the vinyl chloride resin, not only polyvinyl chloride but also a copolymer comprising 70% by weight of units derived from vinyl chloride can be used. Where this copolymer is used as the vinyl chloride resin, as the monomer copolymerizable with vinyl chloride, there can be mentioned ethylene, propylene, vinyl bromide, vinylidene chloride, vinyl acetate, an acrylic acid ester and a methacrylic acid ester.

When the processing aid of the present invention is incorporated in a thermoplastic resin, the processing aid is mixed, preferably in the powdery form, with the thermoplastic resin by using, for example, a ribbon blender or a Henschel mixer. At the processing step, the composition is kneaded by using, for example, a mixing roll or a Banbury mixer, and shaping is performed by using an extruder or an injection molding machine.

The amount of the processing aid incorporated is 0.05 to 40 parts by weight, preferably 0.1 to 20 parts by weight, per 100 parts by weight of the thermosetting resin. If the amount of the processing aid incorporated is smaller than 0.05 part by weight, the processability of the resin is not sufficient by improved. If the amount of the processing aid incorporated is larger than 40 parts by weight, the inherent mechanical properties of the resin are degraded.

When the processing aid of the present invention is incorporated, known stabilizers, plasticizers, lubricants, colorants and impact modifiers can be incorporated in combination with the processing aid, according to need.

The present invention will now be described in detail with reference to the following examples and comparative examples. Note, all of "parts" in the examples are by weight. The reduced viscosity $\eta sp/C$ of each of the first-stage polymers was a value actually measured with respect to the sampled polymer.

EXAMPLE 1

A reaction vessel equipped with a stirrer and a reflux cooler was charged with 280 parts of deionized water, 1.5 parts of sodium dioctyl sulfosuccinate and 2.0 parts of ammonium persulfate, and then the inner atmosphere of the reaction vessel was substituted with nitrogen and a mixture of 80 parts of ethyl methacrylate, 10 parts of methyl methacrylate and 0.5 part of tertiary-dodecylmercaptan was charged as the component (A) into the reaction vessel. The temperature was elevated to 65° C and polymerization was carried out for 2 hours with stirring, and 10 parts of methyl methacrylate was added dropwise as the component (B) to the reaction mixture over a period of 1 hour. After completion of the dropwise addition, the reaction mixture was maintained at the same temperature for 3 hours to complete the reaction and obtain a two-stage polymer latex. The obtained two stage polymer was precipitated by incorporating the two-stage polymer latex into a 5% aqueous solution of magnesium sulfate with stirring. The precipitate two-stage polymer was recovered, washed, dehydrated and dried to obtain a powdery processing aid. Note, the reduced viscosity $\eta sp/C$ of the polymer obtained by the polymerization of the component (A) was 1.7, and the final two-stage polymer had a reduced viscosity $\eta sp/C$ of 1.5.

COMPARATIVE EXAMPLE 1

Under the same conditions as described in Example 1, a copolymer latex was obtained by charging a mixture of 80 parts of methyl methacrylate, 20 parts of ethyl acrylate and 0.5 part of tertiary-dodecylmercaptan as the component (A) without using the component (B), elevating the temperature to 65° C, carrying out the polymerization for 3 hours with stirring and terminating the reaction. The obtained copolymer latex was coagulated, washed, dehydrated and dried under the same conditions as described in Example 1 to obtain a powdery processing aid. The reduced viscosity $\eta sc/C$ of the copolymer was 1.5.

COMPARATIVE EXAMPLE 2

A two-stage polymer was prepared under the same conditions as described in Example 1 except that a mixture of 50 parts of methyl methacrylate, 25 parts of butyl acrylate and 0.5 part of n-octylmercaptan was first polymerized as the component (A) and 25 parts of methyl methacrylate was added and polymerized as the component (B). The reduced viscosity $\eta sp/C$ of the polymer obtained by the polymerization of the component (A) was 1.6, and the reduced viscosity $\eta sp/C$ of the final two-stage polymer was 1.6.

COMPARATIVE EXAMPLE 3

Under the same conditions as described in Example 1, a three-stage polymer was obtained by first polymerizing a mixture of 30 parts of methyl methacrylate and 0.1 part of tertiary-dodecylmercaptan as the component (A), then adding and polymerizing a mixture of 25 parts of styrene, 25 parts of butyl acrylate and 0.05 part of tertiary-dodecylomercaptan and finally adding and polymerizing a mixture of 20 parts of methyl methacrylate and 0.05 part of tertiary-dodecylmercaptan. The reduced viscosity $\eta sp/C$ of the polymer obtained by the polymerization of the component (A) was 1.8, and the reduced viscosity $\eta sp/C$ of the final three-stage polymer was 1.4.

EXAMPLE 2 AND COMPARATIVE EXAMPLES 4 THROUGH 6

Preparation of Rigid Vinyl Chloride Resin Compositions

A common resin composition comprising 100 parts of a vinyl chloride resin having an average polymerization degree of 700, 2 parts of dibutyltin mercaptan, 1 part of butyl stearate and 0.7 part of a lubricant was mixed with 3 parts of the polymer obtained in each of Example 1 and Comparative Examples 1, 2, and 3, the composition was mixed by using a Henschel mixer until the temperature was elevated to 120° C., and thus four kinds of vinyl chloride resin compositions were obtained.

The following tests were carried out with respect to the obtained resin compositions.

1) Gelling Characteristics

By using a Brabender Plasti-Corder, the time Tmax (minutes) required for the kneading resistance to arrive at the maximum value Mmax (kg-m) under the conditions of a kneading temperature of 185° C., a rotation number of 30 rpm, a filled quantity of 60 g, and a preheating time of 5 minutes, that is, the gelation time (minutes), was measured. The shorter this time, the higher the gelation speed and the easier the processing.

2) Flow Marks

By using a T-die-equipped single-screw extruder having a screw diameter of 40 mm (extruder temperatures: $C_1=140°$ C., $C_2=160°$ C., $C_3=180°$ C. and $C_4=190°$ C.; die temperature=195° C.), a sheet having a thickness of 0.2 mm was prepared, the formation of flow marks was checked with the naked eye, and the evaluation was made according to the following standard.
A: no flow marks observed
B: flow mars observed

3) Ungelled substance

The number of ungelled substances present on the surface of the sheet obtained in (2) above was counted with the naked eye, and the evaluation was made according to the following standard.
A: little observed
B: many observed
C: very many observed

Preparation of Plasticized Vinyl Chloride Resin Compositions

A common resin composition comprising 100 parts of a vinyl chloride resin having an average polymerization degree of 700, 1.8 parts of dibutyltin maleate, 1 part of butyl stearate and 40 parts of dioctyl phthalate was mixed with 3 part of the polymer obtained in each of Example 1 and comparative Example 1, 2 and 3 by a Henschel mixer until the temperature was elevated to 150° C., whereby 4 kinds of plasticized vinyl chloride resins compositions were obtained and were subjected to the flexible dispersibility test in the following manner.

By using a T-die-equipped single-screw extruder having a screw diameter of 40 mm (extruder temperatures: $C_1=140°$ C., $C_2=150°$ C., $C_3=160°$ C. and $C_4=170°$ C.; die temperature=180° C.), a sheet having a thickness of 0.2 mm was prepared, and the number of ungelled substances present on the surface of the sheet was counted with the naked eye. The evaluation was made based on the number of ungelled substances appearing in an area of 20 cm×15 cm.

The evaluation results are shown in Table 1.

The abbreviations in Table 1 and subsequent tables indicated the following compounds.
EMA: ethyl methacrylate
MMA: methyl methacrylate
EA: ethyl acrylate
BA: butyl acrylate
St: styrene

TABLE 1

| | Processing aid | | | Rigid vinyl chloride resin composition | | | | Number of ungelled substances in plasticized vinyl chloride resin composition |
|---|---|---|---|---|---|---|---|---|
| | | | | Gelling characteristics | | | | |
| | Monomer composition | | Polymer $\eta sp/C$ | Tmax (min) | Mmax (kg-m) | Flow mark | Ungelled substance | |
| Example 2 | EMA/MMA ← MMA 80/10    10 | | 1st-stage 1.7 | 0.3 | 350 | A | A | 2 |
| | | | Final polymer 1.5 | | | | | |
| Comparative Example 4 | MMA/EA 80/20 | | Final polymer 1.5 | 0.5 | 390 | B | C | Innumerable |
| Comparative Example 5 | MMA/Ba ← MMA 50/25    25 | | First stage 1.6 | 0.4 | 400 | B | B | 30 |
| | | | Final polymer 1.6 | | | | | |
| Comparative Example 6 | MMA ← St/BA ← MMA 30   25/25   20 | | First 1.8 | 1.1 | 390 | B | B | 20 |
| | | | Final polymer 1.4 | | | | | |

EXAMPLE 3

A two-stage polymer was obtained by carrying out the polymerization under the same conditions as described in Example 1 except that a mixture of 90 parts of butyl methacrylate and 0.4 part of tertiary-dodecylmercaptan was used as the component (A) and 10 parts of methyl methacrylate was used as the component (B). The reduced viscosity $\eta sp/C$ of the polymer obtained by the polymerization of the component (A) was 1.6 and the reduced viscosity ηsp/C final two-stage polymer was 1.9.

EXAMPLE 4

A two-stage polymer was prepared by carrying out the polymerization under the same conditions as described in Example 1 except that a mixture of 50 parts of butyl methacrylate, 30 parts of methyl methacrylate and 0.5 part of tertiary-dodecylmercaptan was used as the component (A) and a mixture of 20 parts of methyl methacrylate and 0.1 part of tertiary-dodecylmercaptan was used as the component (B). The reduced viscosity ηsp/C of the polymer obtained by the polymerization of the component (A) was 1.5, and the reduced viscosity ηsp/C of the final two-stage polymer was 1.5.

COMPARATIVE EXAMPLE 7

A two-stage polymer was prepared by carrying out the polymerization under the same conditions as described in Example 1 except that a mixture of 20 parts of butyl methacrylate, 60 parts of methyl methacrylate and 0.6 part of tertiary-dodecylmercaptan was used as the component (A) and a mixture of 20 parts of methyl methacrylate and 0.1 part of tertiary-dodecylmercaptan was used as the component (B). The reduced viscosity ηsp/C of the polymer obtained by the polymerization of the component (A) was 1.6, and the reduced viscosity ηsp/C of the final two-stage polymer was 1.5.

COMPARATIVE EXAMPLE 8

A two-stage polymer was prepared by carrying out the polymerization under the same conditions as described in Example 1 except that a mixture of 30 parts of butyl methacrylate, 10 parts of methyl methacrylate and 0.5 part of tertiary-dodecylmercaptan was used as the component (A) and a mixture of 60 parts of methyl methacrylate and 0.2 part of tertiary-dodecylmercaptan was used as the component (B). The reduced viscosity ηsp/C of the polymer obtained by the polymerization of the component (A) was 1.4, and the reduced viscosity ηsp/C of the final two-stage polymer was 1.8.

EXAMPLES 5 AND 6 AND COMPARATIVE EXAMPLES 9 AND 10

Four kinds of rigid vinyl chloride polymer resin compositions and four kinds of plasticized vinyl chloride resin compositions were prepared by using 3 parts each of the polymers obtained in Examples 3 and 4 and Comparative Examples 7 and 8 according to the recipes described in Example 2. The tests were carried out in the same manner as described in Example 2.

The evaluation results are shown in Table 2.

Note, BMA in Table 2 indicates butyl methacrylate.

TABLE 2

| | Procesing aid | | | | Rigid vinyl chloride resin composition | | | | Number of ungelled substances in plasticized vinyl chloride resin composition |
|---|---|---|---|---|---|---|---|---|---|
| | Monomer composition | | Polymer ηsp/C | | Gelling characteristics | | | | |
| | | | | | Tmax (min) | Mmax (kg-m) | Flow mark | Ungelled substance | |
| Example 5 | BMS ← MMA 90   10 | | First stage | 1.6 | 0.25 | 340 | A | A | 5 |
| | | | Final polymer | 1.9 | | | | | |
| Example 6 | BMA/MMA ← MMA 50/30   20 | | First stage | 1.5 | 0.3 | 360 | A | A | 1 |
| | | | Final polymer | 1.4 | | | | | |
| Comparative Example 7 | BMA/MMA ← MMA 20/60   20 | | First stage | 1.6 | 0.5 | 400 | B | B | 35 |
| | | | Final polymer | 1.5 | | | | | |
| Comparative Example 8 | BMA/MMA ← MMA 30/10   60 | | First stage | 1.4 | 1 | 410 | B | B | Innumeral |
| | | | Final polymer | 1.8 | | | | | |

EXAMPLE 7

A two-stage polymer was prepared by carrying out the polymerization under the same conditions as described in Example 1 except that a mixture of 80 parts of ethyl methacrylate, 10 parts of methyl methacrylate and 0.5 part of tertiary-dodecylmercaptan was used as the component (A) and a mixture of 10 parts of methyl methacrylate and 0.5 part by weight of tertiary-dodecylmercaptan was used as the component (B). The reduced viscosity ηsp/C of the polymer obtained by the polymerization of the component (A) was 1.7, and the reduced viscosity ηsp/C of the final two-stage polymer was 1.

EXAMPLE 8

A two-stage polymer was prepared by carrying out the polymerization under the same conditions as described in Example 1 except that a mixture of 80 parts of ethyl methacrylate, 10 parts of methyl methacrylate and 1.0 part of tertiary-dodecylmercaptan was used as the component (A) and 10 parts of methyl methacrylate was used as the component (B). The reduced viscosity ηsp/C of the polymer obtained by the polymerization of the component (A) was 0.5, and the reduced viscosity ηsp/C of the final two-stage polymer was 0.7.

COMPARATIVE EXAMPLE 11

A two-stage polymer was prepared by carrying out the polymerization under the same conditions as described in Example 1 except that a mixture of 80 parts of ethyl methacrylate, 10 parts of methyl methacrylate and 0.05 part of tertiary-dodecylmercaptan was used as the component (A) and 10 parts of methyl methacrylate was used as the component (B). The reduced viscosity ηsp/C of the polymer obtained by the polymerization of the component (A) was 3, and the reduced viscosity ηsp/C of the final two-stage polymer was 3.5.

EXAMPLES 9 AND 10 AND COMPARATIVE EXAMPLE 12

Three kinds of rigid vinyl chloride resin compositions and 3 kinds of plasticized vinyl chloride resin compositions were prepared by using 3 parts each of the two-stage polymers obtained in Examples 7 and 8 and Comparative Example 11 according to the recipes described in Example 2 and were subjected to the tests in the same manner as described in Example 2.

The evaluation results are shown in Table 3.

(2) Styrene resin (Styrol NF-20 supplied by Idemitsu Petrochemical), molding temperatures: $C_1 = 160°$ C., $C_2 = 180°$ C., $C_3 = 200°$ C., head temperature = 200° C., die temperature = 210° C.)

(3) Polycarbonate resin (Novalex 7022 supplied by Mitsubishi Chem.), molding temperatures: $C_1 = 230°$ C., $C_2 = 260°$ C., $C_3 = 270°$ C., head temperature = 270° C., die temperature = 280° C.

(4) Polyethylene resin (Hi-Zex 7000F supplied by Mitsui Petrochemical), molding temperatures: $C_1 = 150°$ C., $C_2 = 165°$ C., $C_3 = 175°$ C., head tem-

TABLE 3

| | Processing aid | | | Rigid vinyl chloride resin composition | | | | Number of ungelled substances in plasticized vinyl chloride resin composition |
| | | | | Gelling characteristics | | | | |
| | Monomer composition | | Polymer $\eta sp/C$ | Tmax (min) | Mmax (kg-m) | Flow mark | Ungelled substance | |
|---|---|---|---|---|---|---|---|---|
| Example 9 | EMA/MMA 80/10 | ← MMA 10 | 1st-stage 1.7 | 0.28 | 340 | A | A | 2 |
| | | | Final polymer 1 | | | | | |
| Example 10 | EMA/MMA 80/10 | ← MMA 10 | First stage 0.5 | 0.25 | 340 | A | A | 1 |
| | | | Final polymer 0.7 | | | | | |
| Comparative Example 12 | EMA/MMA 80/10 | ← MMA 10 | First stage 3 | 0.35 | 420 | B | B | 4 |
| | | | Final polymer 3.5 | | | | | |

EXAMPLES 11 THROUGH 15 AND COMPARATIVE EXAMPLES 13 THROUGH 17

By using a Henschel mixer, 100 parts of a thermoplastic resin described below, with or without 3 parts of the processing aid obtained in Example 1, was mixed, and the resin was pelletized by using an extruder having a screw diameter of 40 mm. The obtained pellet was dried at 80° C. for more than 1 hour. Then the pellet was formed into a bottle at a temperature shown below, which was determined according to the kind of resin, by using a blow-molding machine. Evaluation tests described below were carried out. The results are shown in Table 4.

(1) ABS resin (Diapet® ABS#3001 supplied by Mitsubishi Rayon), molding temperatures: $C_1 = 180°$ C., $C_2 = 200°$ C., $C_3 = 200°$ C., head temperature = 200° C., die temperature = 200° C.)

perature = 175° C., die temperature = 175° C.

(5) Polyester resin (Dianite® A-200 supplied by Mitsubishi Rayon), molding temperatures: $C_1 = 280°$ C., $C_2 = 280°$ C., $C_3 = 280°$ C., head temperature = 260° C., die temperature = 260° C.

The evaluation items of the bottles are as follows.

1) Draw-down of a parison at the molding step

A: large die well and no drop-down
B: small die well and drop-down observed

2) Judgement of the bottle appearance by naked eye:

A: good gloss and no surface roughness
B: poor gloss and conspicuous surface roughness 3) Naked eye observation of state of formation of ungelled substances in bottle wall A: few ungelled substances observed
B: a number of ungelled substances observed

TABLE 4

| | Thermoplastic resin | Processing aid | Draw-down at molding step | Appearance of bottle | Ungelled substances in bottle |
|---|---|---|---|---|---|
| Example 11 | ABS resin | Added | A | A | A |
| Comparative Example 13 | " | Not added | B | A | B |
| Example 12 | Styrene resin | Added | A | A | A |
| Comparative Example 14 | Styrene resin | Not added | B | A | B |
| Example 13 | Polycarbonate resin | Added | A | A | A |
| Comparative Example 15 | Polycarbonate resin | Not added | B | B | B |
| Example 14 | Polyethylene resin | Added | A | A | A |
| Comparative Example 16 | Polyethylene resin | Not added | B | B | A |

TABLE 4-continued

|  | Thermoplastic resin | Processing aid | Draw-down at molding step | Appearance of bottle | Ungelled substances in bottle |
|---|---|---|---|---|---|
| Example 15 | Polyester | Added | A | A | A |
| Comparative Example 17 | Polyester | Not added | B | A | A |

As apparent from the results shown in Table 4, thermoplastic resins in which the processing assistant aid of Example 1 is incorporated have excellent processability characteristics, regardless of the kind of thermoplastic resin.

When the processing aid of the present invention having the above-mentioned construction is incorporated into various thermoplastic resins, the shaping processability of the thermoplastic resins can be greatly improved, and the surface characteristics of shaped articles of the resins can be improved. Moreover, when the processing aid of the present invention is incorporated in a plasticized vinyl chloride polymer resin, the dispersibility is improved and ungelled substances are not formed.

We claim:

1. A processing aid for a thermoplastic resin, which comprises a two-stage polymer obtained by polymerizing (B) 5 to 50 parts by weight of a monomer or monomer mixture composed of more than 50% by weight of methyl methacrylate in the presence of (A) 50 to 95 parts by weight of a polymer comprising 100 to 50% by weight of units of a methacrylic acid ester other than methyl methacrylate and 0 to 50% by weight of units of other monomer copolymerizable with the methacrylic acid ester and having a reduced viscosity ηsp/C not larger than 2.0 (as measured at 25° C. with respect to a solution of 0.1 g of the polymer in 100 ml of chloroform; the unit being dl/g), so that the total amount of the components (A) and (B) is 100 parts by weight and the reduced viscosity ηsp of the final polymer is not larger than 2.0.

2. The processing aid according to claim 1 wherein the methacrylic acid ester other than methyl methacrylate is selected from the group consisting of ethyl methacrylate, n-butyl methacrylate, isobutyl methacrylate, 2-ethylhexyl methacrylate, benzyl methacrylate, cyclohexyl methacrylate and lauryl methacrylate; and the other monomer copolymerizable with the methacrylic acid ester is selected from the group consisting of an acrylic acid ester having 2 to 10 carbon atoms, methyl methacrylate, an aromatic vinyl compound and a vinyl cyanide compound.

3. The processing aid according to claim 1 wherein the methacrylic acid ester other than methyl methacrylate is n-butyl methacrylate, and the other monomer copolymerizable with the methacrylic acid ester is methyl methacrylate.

4. The processing aid according to claim 1 wherein the polymer (A) comprises 55 to 95% by weight of units of a methacrylic acid ester other than methyl methacrylate and 45 to 5% by weight of units of other monomer copolymerizable with the methacrylic acid ester.

5. The processing aid according to claim 1 wherein 10 to 30 parts by weight of the monomer or monomer mixture (B) is polymerized in the presence of 70 to 90 parts by weight of the polymer (A).

6. The processing aid according to claim 1 wherein the polymerization for the polymer (A) is carried out by an emulsion polymerization procedure, and the polymerization of the monomer or monomer mixture (B) is carried out by an emulsion polymerization procedure without adding a fresh emulsifier.

7. A thermoplastic resin composition comprising 100parts by weight of a thermoplastic resin and 0.05 to 40 parts by weight of a processing aid as set forth in claim 1.

8. The thermoplastic resin composition according to claim 7 wherein the thermoplastic resin is selected from the group consisting of vinyl chloride resins (inclusive of chlorinated vinyl chloride resins and vinylidene chloride resins), polycarbonate resins, polyethylene resins, vinyl fluoride resins, polyester resins, styrene resins, acrylonitrile/styrene copolymer resins, methacrylic polymer resins and ABS resins.

9. The thermoplastic resin composition according to claim 7 which comprises 100 parts by weight of a thermoplastic resin and 0.1 to 20 parts by weight of said processing aid.

* * * * *